United States Patent
Thiyagarajan (10) Patent No.: US 7,406,469 B1
(45) Date of Patent: Jul. 29, 2008

(54) LINEAR INSTANCE MAPPING FOR QUERY REWRITE

(75) Inventor: Murali Thiyagarajan, Concord, NH (US)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 10/177,440

(22) Filed: Jun. 20, 2002

(51) Int. Cl.
*G06F 7/00* (2006.01)

(52) U.S. Cl. ................................ 707/5; 707/3; 707/4

(58) Field of Classification Search ........... 707/1–104.1
See application file for complete search history.

(56) References Cited

U.S. PATENT DOCUMENTS

| | | | |
|---|---|---|---|
| 4,773,862 A * | 9/1988 | Baba ........................ 434/154 |
| 5,560,029 A * | 9/1996 | Papadopoulos et al. ....... 712/25 |
| 5,742,806 A * | 4/1998 | Reiner et al. .................. 707/3 |
| 5,765,147 A | 6/1998 | Mattos et al. |
| 5,778,353 A | 7/1998 | Schiefer et al. |
| 5,819,251 A * | 10/1998 | Kremer et al. ................. 707/1 |
| 5,822,751 A | 10/1998 | Gray et al. |
| 5,970,490 A * | 10/1999 | Morgenstern ................ 707/10 |
| 6,026,390 A | 2/2000 | Ross et al. |
| 6,205,451 B1 | 3/2001 | Norcott et al. |
| 6,289,334 B1 * | 9/2001 | Reiner et al. .................. 707/3 |
| 6,289,335 B1 | 9/2001 | Downing et al. |
| 6,298,342 B1 * | 10/2001 | Graefe et al. .................. 707/4 |
| 6,334,128 B1 | 12/2001 | Norcott et al. |
| 6,339,769 B1 | 1/2002 | Cochrane et al. |
| 6,356,889 B1 | 3/2002 | Lohman et al. |
| 6,356,890 B1 | 3/2002 | Agrawal et al. |
| 6,356,891 B1 | 3/2002 | Agrawal et al. |
| 6,457,020 B1 * | 9/2002 | Carey et al. ............. 707/103 R |
| 6,473,201 B1 * | 10/2002 | Sato ........................... 358/1.9 |
| 6,493,699 B2 | 12/2002 | Colby et al. |
| 6,493,701 B2 * | 12/2002 | Ponnekanti ..................... 707/2 |
| 6,496,819 B1 | 12/2002 | Bello et al. |
| 6,510,422 B1 * | 1/2003 | Galindo-Legaria et al. ..... 707/2 |
| 6,560,476 B1 * | 5/2003 | Pelletier et al. ............. 600/410 |

(Continued)

FOREIGN PATENT DOCUMENTS

JP          05104972 A  *  4/1993

OTHER PUBLICATIONS

Randall et al., "Materialized Views in Oracle", Proceedings of the 24th VLDB Conference New York, USA, 1998, pp. 659-664.*

(Continued)

*Primary Examiner*—Don Wong
*Assistant Examiner*—Linh Black
(74) *Attorney, Agent, or Firm*—Hickman Palermo Truong & Becker LLP (57) ABSTRACT

Described herein are instance mapping techniques that facilitate the rewrite of queries to access materialized views that have multiple instances of the same table. Instance mapping techniques are processes for determining a mapping between equivalent instances in a query and materialized view definition. An instance in a query that is equivalent to an instance in a materialized view definition (or another query) is treated as if they are identical labels for the same table for the purposes of rewriting a query. To determine the mapping between instances of a table in a query and a materialized view definition, join predicates in the query and materialized view definition that involve instances of the table are compared.

20 Claims, 7 Drawing Sheets

U.S. PATENT DOCUMENTS

| | | | |
|---|---|---|---|
| 6,629,094 | B1 | 9/2003 | Colby et al. |
| 6,748,392 | B1* | 6/2004 | Galindo-Legaria et al. ... 707/102 |
| 6,785,673 | B1* | 8/2004 | Fernandez et al. ............. 707/3 |
| 6,912,524 | B2* | 6/2005 | Acharya et al. ................ 707/3 |
| 6,957,225 | B1 | 10/2005 | Zait et al. |
| 2001/0013030 | A1* | 8/2001 | Colby et al. .................... 707/1 |
| 2002/0077997 | A1* | 6/2002 | Colby et al. .................... 707/1 |
| 2002/0138460 | A1* | 9/2002 | Cochrane et al. ............... 707/1 |
| 2003/0084043 | A1* | 5/2003 | Acharya et al. ................ 707/5 |
| 2003/0088558 | A1* | 5/2003 | Zaharioudakis et al. ........ 707/3 |
| 2003/0135480 | A1 | 7/2003 | Van Arsdale et al. |
| 2003/0159136 | A1 | 8/2003 | Huang et al. |
| 2003/0200218 | A1* | 10/2003 | Tijare et al. ................. 707/100 |
| 2003/0212664 | A1* | 11/2003 | Breining et al. ................ 707/3 |
| 2004/0122828 | A1 | 6/2004 | Sidle et al. |
| 2005/0055382 | A1 | 3/2005 | Ferrat et al. |
| 2005/0097100 | A1* | 5/2005 | Galindo-Legaria et al. ..... 707/3 |

OTHER PUBLICATIONS

Divesh et al., "Answering Queries with Aggregation Using Views", Proceeding of the 22nd VLDB Conference Mumbai, India, 1996, pp. 318-329.*

Vivikanand Gopalkrishnand, et al., "Issues of Object-Relational View Design in Data Warehousing Environment," IEEE 1998, 0780347781, pp. 2732-2737.

Chenho I. Kung, "Object Subclass Hierarchy in SQL: A Simple Approach," Communications of the ACM, Jul. 1990, vol. 33, No. 7, pp. 117-125.

Randall G. Bello, et al., "Materialized View in Oracle", VLDB '98, Proceedings of the 24th International Conference on Very Large Data Bases, Aug. 24-27, 1998, New York City, New York, USA, pp. 659-664.

Faiza Najjar, et al., "Cardinality estimation of distributed join queries," Sep. 1-3, 1999; Database and Expert Systems Applications, 1999, Proceedings, Tenth International Workshop on, pp. 66-70.

Gianluca Moro, et al., "Incremental maintenance of multi-source views," Database Conference, 2001, ADC 2001, Proceedings, 12th Australasian, Jan. 2001, pp. 13-20.

West, Douglas B., et al., "Introduction to Graph Theory Second Edition", Prentice Hall, 2001, 6 pages.

* cited by examiner

110

MVE = SELECT E1.c1, E2.c2, SUM(E2.sales)
FROM E E1, E E2
GROUP BY E2.c2, E1.c1

FIG. 1A

QE = SELECT E1.c1, E2.c2, SUM(E2.sales)
FROM E E1, E E2
GROUP BY E1.c2, E2.c1

MVEE = SELECT F1.c1, F2.c2, SUM(F2.sales)
FROM E F1, E F2
GROUP BY F2.c2, F1.c1

Join Predicate Matrix $JPM_{QI}$

|     | B | C | D |       |
|-----|---|---|---|-------|
| $A_X$ | 1 | 2 | 1 | = 4 |
| $A_Y$ | 1 | 0 | 0 | = 1 |
| $A_Z$ | 0 | 0 | 0 | = 0 |

312 (label on matrix), 314 (row labels), row sums 310

Join Predicate Matrix $JPM_{MV}$

|     | B | C | R |       |
|-----|---|---|---|-------|
| $L_U$ | 1 | 2 | 1 | = 4 |
| $L_V$ | 1 | 0 | 0 | = 1 |
| $L_W$ | 0 | 0 | 0 | = 0 |

354 (row labels), row sums 350

LINEAR INSTANCE MAPPING FOR QUERY REWRITE

FIELD OF THE INVENTION

The present invention relates to rewriting queries to access materialized views, and in particular, to rewriting a query to access materialized view, where the query and materialized use different labels for the same table.

BACKGROUND OF THE INVENTION

In a database management system (DBMS), data is stored in one or more data containers, each container contains records, and the data within each record is organized into one or more fields. In relational DBMSs, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

It is common for identical or closely related queries to be issued frequently. For example, a business may periodically generate reports that summarize business facts stored in the database, such as: "What have been the best selling brands of soft drinks in each of our sales regions, during the past six months?".

To respond to such queries, the database server typically has to perform numerous join operations because the database records contain the information that is required to respond to the queries. When a DBMS contains very large amounts of data, certain queries against the database can take an unacceptably long time to execute. The cost of executing a query may be particularly significant when the query (which takes the form of a "SELECT" statement in the SQL database language) requires join operations among a large number of database tables.

A join is an operation that combines rows from two or more tables that meet a join condition. A join may be specified by a query by including the tables to be joined in the FROM list and including join predicates in the WHERE clause. Join predicates are expressions specifying join conditions. The following query QZ is provided as an example of a query that specifies a join operation.

SELECT*FROM Y,Z WHERE Y.a=Z.a

The expression of "Y.a=Z.a" is an example of join predicate that defines a join condition. Query QZ specifies that a row in table Z is joined with a row table Y if the value of column Y.a of the row in table Y equals the value of the column Z.a for the row in table Z. The join specified by query QZ is referred to as an "equijoin" because the condition is based on the equality of values in columns.

In addition to join conditions, the WHERE clause of a join query can also contain other predicates that refer to a column of only one table. These conditions can further restrict the rows returned by the join query.

Materialized Views

Among commercial users of DBMSs, it has become a common practice to store the results of often-repeated queries in database tables or some other persistent database object. By storing the results of queries, costly join operations required to generate the results do not have to be performed every time the queries are issued. Rather, the database server responds to the queries by simply retrieving the pre-computed data.

These stored results are commonly referred to as materialized views. The contents of a materialized view are defined by metadata referred to as a materialized view definition. The materialized view definition contains mappings to one or more columns in the one or more tables containing the data. Columns and tables that are mapped to a materialized view are referred to herein as base columns and base tables of the materialized view, respectively. The materialized view query is computed and the results are stored as the materialized view. The results can be in the form of rows, which may be rows from a single base table or rows created by joining rows in the base table.

Query Rewrite

Materialized views eliminate the overhead associated with gathering and deriving the data every time a query is executed. Through a process known as query rewrite, a query can be optimized to recognize and use existing materialized views that could answer the query. Typically, the query rewrite optimization is transparent to the application submitting the query. That is, the rewrite operation happens automatically and does not require the application to know about the existence of materialized views, nor that a particular materialized view has been substituted for the original query.

Database systems that include query rewrite mechanisms may employ several types of rewrite techniques—an exact-text-match technique and a general rewrite technique. To rewrite a query to access a particular materialized view using any of these type of techniques, the materialized view must satisfy rewrite criteria. For an exact-text-match technique, the query to be rewritten must match, to the character, the query that defines a materialized view. For the general rewrite technique, the materialized view must satisfy rewrite criteria that includes the following: (1) data sufficiency (2) join compatibility.

With respect to data sufficiency, the criteria is passed if all necessary columns of a query can be obtained from the materialized view or derived from data stored in the materialized view.

With respect to join compatibility, the criteria maybe satisfied if all joins in a materialized view (i.e. joins defined for the materialized view) match exactly the joins in a query, with possibly zero or more additional joins in the query. For example, if a materialized view joins tables A and B, and the query requires a join of A, B and C, then the join compatibility test is passed. However, if the materialized view joins tables A, B and D, and the query requires a join of A, B and C, then the join compatibility test fails.

The join compatibility test may also be satisfied by a materialized view that contains joins that do not match any join in the query, if the non matching joins are lossless with respect to the matching joins. A join is referred to as a "lossless" with respect to a table when all rows in the table are reflected in the join result. For example, when a query joins A, B, and a materialized view joins tables A, B, and D, and the join between A, B, and D is lossless with respect to join between A and B, the query may be rewritten to access the materialized view.

Unfortunately, database servers often do not use a materialized view to rewrite a query when in fact they could. One such case occurs when multiple instances of the same table occur in a query. An instance of table is one or more uses of a label within query to refer to the table. To illustrate instances, FIG. 1A is provided.

Figure 1A:
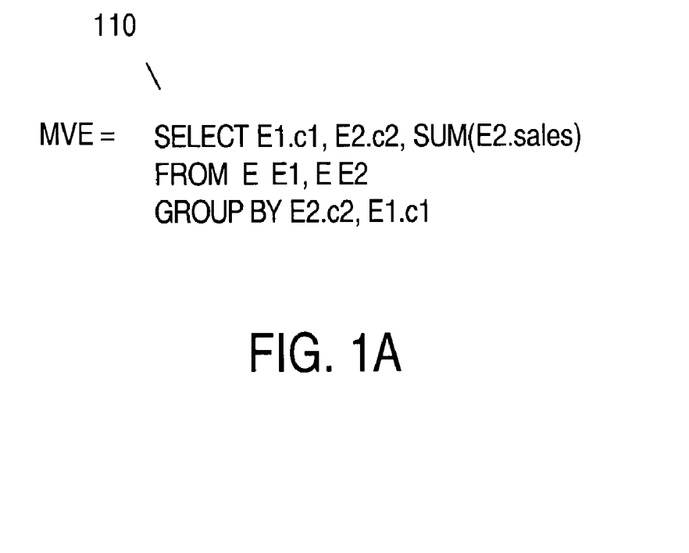
FIG. 1A is a diagram showing a materialized view definition.

FIG. 1A is a diagram showing a materialized view definition 110, which defines materialized view MVE. Materialized view definition 110 is in the form of a SQL query. The FROM clause of materialized view definition 110 uses "aliases" E1 and E2 for table E. An alias is alternative label defined in a database command for a table. An alias is different than the name of a table. A table name, is in effect, a label globally recognized by a database system as referring to the table. An alias, on the other hand, is a label a database system recognizes as referring to the table when the alias is used within the query that defines the alias.

For example, in the GROUP BY clause of materialized view definition 110, a database system recognizes the reference of E2.c2 as referring to column E.c2 (that is, column c2 of table E), and E1.c1 as referring to column E.c1.

Materialized view definition 110 includes three instances of table E because it has three labels that refer to table E. These are E, the table name, and E1 and E2, aliases defined by materialized view definition 110.

In database systems that use the exact-text-match technique, a query with multiple instances of a table is written to access a materialized view that uses the aliases for the same table only if the query and the materialized view definition are identical. If there is one small difference, then a query rewrite is not performed.

Figure 1B:
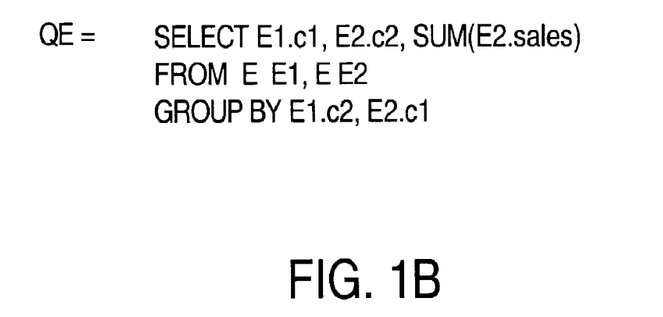
FIG. 1B is a diagram showing a query.

For example, FIG. 1B shows query QE, which is similar to materialized view definition 110. Both use the same aliases E1 and E2 for table E. However, under the exact-text-match technique, query QE is not rewritten because it is not identical to the materialized view definition 110. In the GROUP BY clause of QE, columns E1.c1 and E2.c2 are referenced in the reverse order as they are in the GROUP BY clause of materialized view definition 110.

Using a general rewrite technique, some database servers can rewrite a query to access a materialized view if identical aliases are used for the same tables. Thus, query QE may be rewritten to access MVE because the instances in query QE can be uniquely matched to an identical instance in MVE. Thus, to ensure that the query can be rewritten to access a materialized view, database users and developers may write queries that use aliases identical to those in the materialized view.

However, constructing a query to use the same aliases in a materialized view is a difficult and laborious task. A user must analyze the existing materialized view definitions and identify the candidates that can be used to rewrite the query. The user must then use the same aliases found in the candidate. In effect, the user is supplanting a query rewrite mechanism by manually applying the general rewrite algorithm to candidate materialized views, and does not realize the benefits of automatic rewrite provided by query rewrite mechanisms. Moreover, applying a general rewrite technique manually can be error prone due to the complexities of rewriting queries.

Based on the foregoing, it is clearly desirable to provide a query rewrite mechanism that does not require that a query use the identical aliases as a materialized view in order to rewrite the query to access the materialized view.

SUMMARY OF THE INVENTION

Described herein are instance mapping techniques that facilitate the rewrite of queries to access materialized views that have multiple instances of the same table. Instance mapping techniques are processes for determining a mapping between equivalent instances in a query and materialized view definition. An instance in a query that is equivalent to an instance in a materialized view definition (or another query) is treated as if they are identical labels for the same table for the purposes of rewriting a query. To determine the mapping between instances of a table in a query and a materialized view definition, join predicates in the query and materialized view definition that involve instances of the table are compared.

DETAILED DESCRIPTION OF THE INVENTION

A method and apparatus for query instance mapping is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein are instance mapping techniques that facilitate the rewrite of queries to access materialized views that have multiple instances of the same tables. Instance mapping techniques are processes for determining a mapping between equivalent instances in a query and materialized view definition. An instance in a query that is equivalent to an instance in a materialized view definition (or another query) is treated as if they are identical labels for the same table for the purposes of rewriting a query. The following items in FIG. 1C are provided to illustrate how a materialized view definition may be evaluated for purposes of rewriting a query that has instances equivalent to those in a materialized view definition.

Figure 1C:
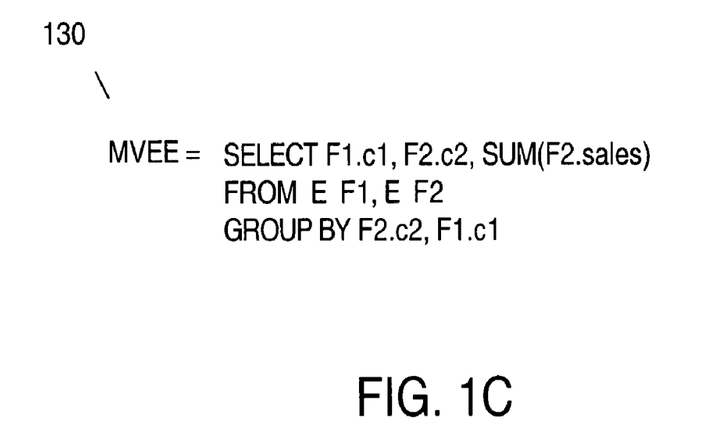
FIG. 1C is a diagram showing a materialized view definition.

Referring to FIG. 1C, it is a diagram depicting materialized view definition 130. Materialized view definition 130 defines materialized view MVEE. For purposes of illustration, instance F1 in the materialized view definition 130 is mapped to instance E1 in query QE. For purposes of determining whether MVEE satisfies data sufficiency criteria for query rewrite, E1 and F1 are treated as being identical labels and as referring to the same table E. Thus, E1.c1 and F1.c1 refer to the same column. Since column E1.c1 is in the SELECT clause of QE, MVEE is required to include this column to satisfy data sufficiency criteria. Column F1.c1 is in the SELECT clause of the materialized view definition 130 for MVEE, therefore MVEE contains the column and satisfies data sufficiency criteria with respect to E1.c1.

An instance is referred to as being in a materialized view if the instance is referenced by the materialized view definition of the materialized view. Thus, instance F1 may be referred to as being in MVEE because the materialized view definition of MVEE references F1.

Mapping multiple instances of a table present in a query to multiple instances of the same table in a materialized view is a difficult and complex problem. To determine mappings of instances, a query and materialized view definition are analyzed to determine how instances may be distinguished from each other. An instance in a query and an instance in a materialized view that are distinguished in similar ways may be considered equivalents.

Many factors may be used to distinguish one instance from another in a query. Factors that are used to distinguish instances include the following.

1. Join predicates involving the instance;
2. Columns from the instance in a SELECT list;
3. Columns from the instance in a GROUP BY clause; and
4. Columns from the instance in a HAVING clause For example, in query QE, the column E1.c1 appears in both the GROUP BY clause and the SELECT clause. The column does not appear in QE with any other instance of the same table QE. The appearance of E1.c1 in the GROUP BY clause and the SELECT clause is a factor that distinguishes E1 from E2, another alias for the same table E. Likewise, in the materialized view definition 130 of MVEE, the column F1.c1 appears in both the GROUP BY clause and the SELECT clause. The column does not appear anywhere in the materialized view definition with any other instance of the same table QE. Thus, the appearance of F1.c1 in the GROUP BY clause and the SELECT clause are factors that distinguish F1 from F2, the other instance of the same table F. Because E1 and F1 are distinguished in similar ways, these instances may be considered equivalent to each other. Consequently, E1 is mapped to F2 as an equivalent instance.

When executing queries, SELECT, GROUP BY, and HAVING clauses are applied only after the join predicates are applied. Thus, it is obvious that join predicates determine the results of a query. Thus, it is advantageous for an instance mapping algorithm to first consider the join predicates in the query and the materialized view to correctly resolve the instances. The term resolve is used herein to refer to determining, for a given instance in a query, the equivalent of the instance in another query or materialized view definition, if any.

Instance Mapping Using Join Graphs

The problem of instance mapping may be solved using join graphs. Join graphs are used to illustrate joins defined in queries. In a join graph, nodes represent an instance of a table and arcs represent a join between the instances. An arc represents a particular join based on a join condition, as defined by a join predicate.

Figure 2A:
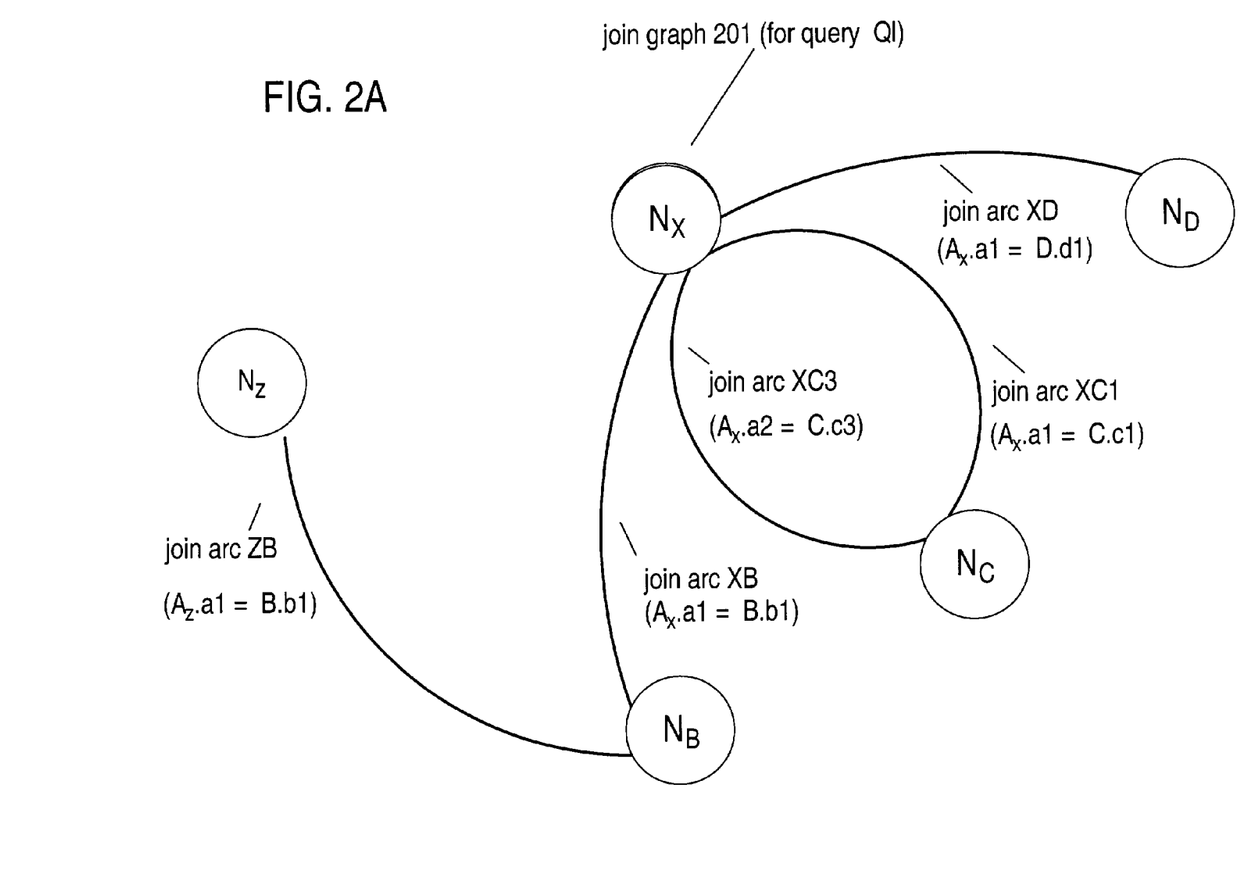
FIG. 2A is a diagram showing a join graph.

FIG. 2A is a join graph of a query QI. QI contains multiple aliases of table A, in the form of $A_X$, $A_Y$, and $A_Z$. Query QI also has join predicates specifying joins $A_X$ and $A_Z$ and tables B, C, and D. Specifically, these join predicates are $A_X.a1=B.b1$, $A_X.a1=C.c1$, $A_X.a2=C.c3$, $A_X.a1=D.d1$, and $A_Z=B.b1$.

Referring to FIG. 2A, it shows join graph 201. Join graph 201 includes nodes $N_X$, $N_Y$, $N_Z$, $N_B$, $N_C$, and $N_D$, which correspond to instances $A_X$, $A_Y$, and $A_Z$ and tables B, C, and D, respectively. Join arc XB represents a join between $A_X$ and B based on the join predicate $A_X.a1=B.b1$. Join arc XC1 represents a join between $A_X$ and C based on the join predicate $A_X.a1=C.c1$. Join arc XC3 represents a join between $A_X$ and C based on the join predicate $A_X.a2=C.c3$. Join arc XD represents a join between $A_X$ and D based on the join predicate $A_X.a1=D.d1$. Join arc ZB represents a join between $A_Z$ and B based on the join predicate $A_Z.B.b1$.

Figure 2B:
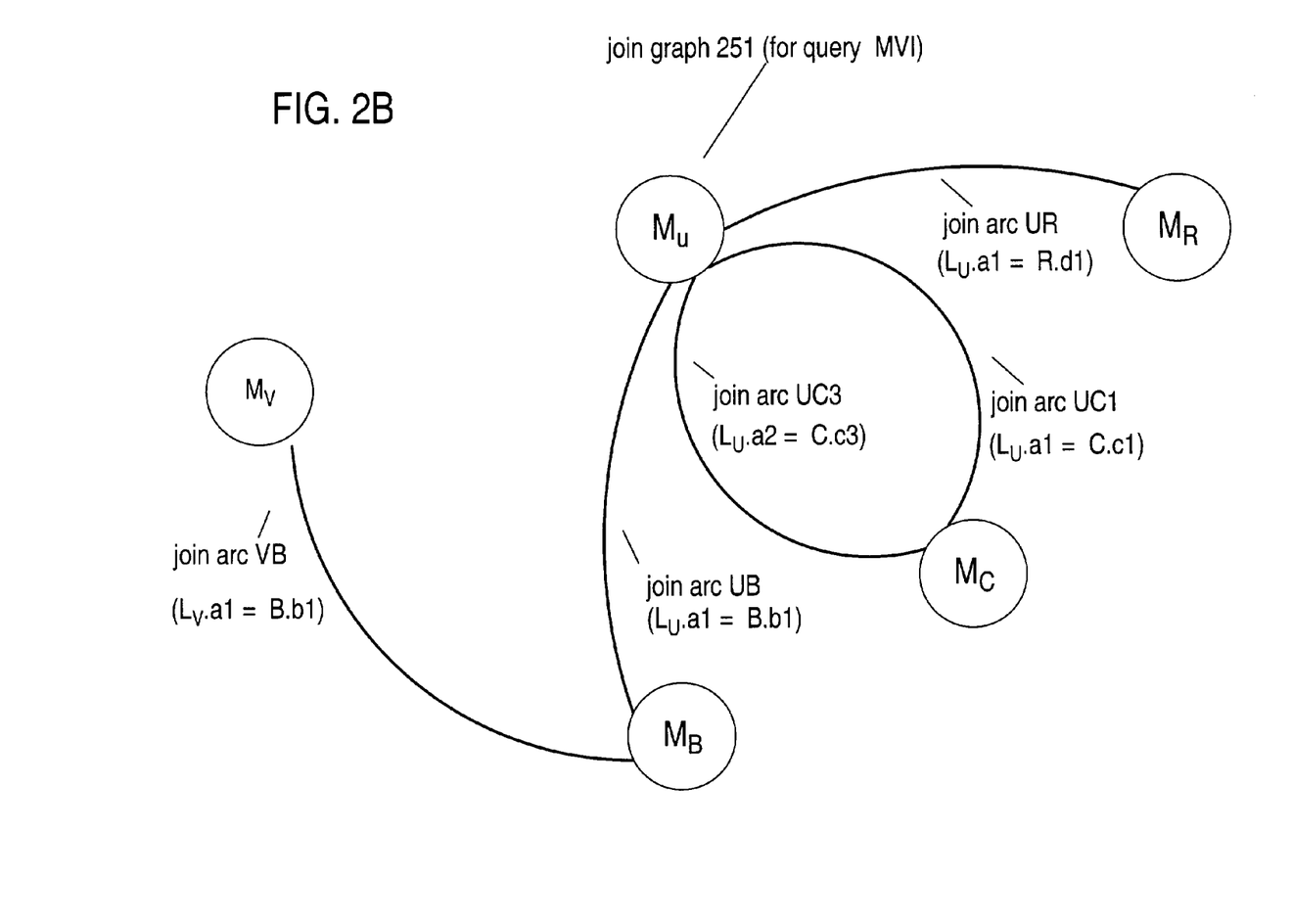
FIG. 2B is a diagram showing a join graph.

FIG. 2B depicts join graph 251, a join graph of materialized view MVI (a definition of MVI is not explicitly shown). MVI includes multiple instances of A, identified herein as $L_U$, $L_V$, and $L_W$. Like query QI, MVI includes joins between instances of table A and tables B and C. Unlike QI, the materialized view definition for MVI specifies a join between an instance of table A and table R, by including the join predicate $L_U.a1=R.d1$.

Join graph 251 includes nodes $M_V$, $M_U$, $M_B$, $M_C$, and $M_R$, which correspond to instances $L_U$, $L_V$, and tables B, C, and R, respectively. Join arc UB represents a join between $L_U$ and B based on the join predicate $L_U.a1=B.b1$. Join arc UC1 represents a join between $L_U$ and C based on the join predicate $L_U.a1=C.c1$. Join arc UC3 represents a join between $L_U$ and C based on the join predicate $L_U.a2=C.c3$. Join arc UR represents a join between $L_U$ and D based on the join predicate $L_U.a1=R.d1$. Join arc VB represents a join between $L_V$ and $M_B$ based on the join predicate $L_V=B.b1$.

Using Join Graphs to Resolve Instances

Because an instance of a table is a node in a join graph, the problem of instance mapping can be solved as a graph matching problem. The type and number of joins for a node can distinguish an instance of a table as a unique object. Instances of nodes distinguished in similar ways in the join graphs of a query and a materialized view definition may be mapped as equivalent aliases.

For example, join graphs 201 and 251 may be examined to determine that instances $A_X$ and $L_U$ may be distinguished in similar ways based on the joins defined between them by the join graphs. Join graphs 201 and 251 indicate that both instances have nodes connected by joins arcs to nodes of the same tables and are based on equivalent join predicates. Join arc UB and join arc XB represent equivalent joins because each join arc represents a join between table B and an instances of table A, each join being defined by equivalent join predicates. The join predicates for the join arcs LB and XB are $L_U.a1=B.b1$ and $A_X.a1=B.b1$, respectively. The join predicates are equivalent because each defines a join condition based on the same table columns. $L_U.a1$ and $A_U.a1$ refer to the same column of table A.

For similar reasons, join arcs UC1 and XC1 represent equivalent joins, join arcs UC3 and XC3 represent equivalent joins, and join arcs UC1 and XC1 represent equivalent joins. Thus, instances $A_X$ and $L_U$ are distinguished in similar ways in join graphs 201 and 251 based on the joins depicted by the graphs, and $A_X$ may be mapped to $L_U$ as an equivalent alias.

On the other hand, in join graph 201, $A_Z$ has no counterpart in join graph 251 distinguished in a similar way by equivalent joins.

Using Join Graphs to Resolve Aliases Entails Numerous Comparisons

As explained above, instances can be resolved by comparing join arcs of join graphs. To make the comparison needed for one instance of a table in a query, each join arc involving that instance must compared with a join arc involving an instance of the table in the join graph of a materialized view definition. The following formula in the following lemma yields the worst case number of comparisons under conditions specified in the lemma.

Lemma 1 Given a materialized view, MV, with m instances on table A and a query Q, with n instances on the same table A with m≧n, the worst case number of comparisons required to correctly map each of the m instances of MV to the instances of Q is, $$c = \frac{1}{2}\binom{m}{n}\binom{n}{2}\left\{\binom{n}{2}+1\right\}.$$

Proof: Since the join graphs are complete graphs with m≧n, there are $\binom{m}{n}$ occurrences of the query join graph $K_n$ in the materialized view join graph $K_m$. There are $\binom{n}{2}$ joins in a complete graph, $K_n$. For each such occurrence of the subgraph $K_n$ in $K_m$, each of the $\binom{n}{2}$ joins in the query join graph need to be compared with a join in the materialized view join graph. The total number of comparisons needed for each of the $\binom{n}{2}$ subgraphs can be computed as follows.

The first join in the query join graph will require at most $\binom{n}{2}$ comparisons. Once the first join is matched, the second join in the query join graph will require at most $\binom{n}{2}$ comparisons. Hence the total number of comparisons required to match all the joins in the query join graph is, $$s = \binom{n}{2} + \binom{n}{2} - 1 + \binom{n}{2} - 2 + \ldots + 1$$

$$= \binom{n}{2}^2 - \left[1 + 2 + \ldots + \binom{n}{2} - 1\right]$$

$$= \frac{1}{2}\binom{n}{2}\left\{\binom{n}{2}+1\right\}$$

Since there are $\binom{m}{n}$ occurrences of $K_n$ subgraphs in graph $K_m$, we need a total of $$S = s\binom{m}{n} = \frac{1}{2}\binom{m}{n}\binom{n}{2}\left\{\binom{n}{2}+1\right\}$$

join comparisons. Thus the lemma follows.

As the number of instances increases, and especially when there is more than one table with multiple instances, the time and complexity entailed to resolve the instances becomes prohibitively high. Therefore, there is a need for instance mapping techniques that resolve instances efficiently. Described herein are single sweep mapping techniques, which may be used for efficient instance mapping. These techniques are referred to as "single sweep mapping" for reasons that shall be described. Single sweep techniques may be implemented using a "join predicate matrix."

Join Predicate Matrix

Figure 3:
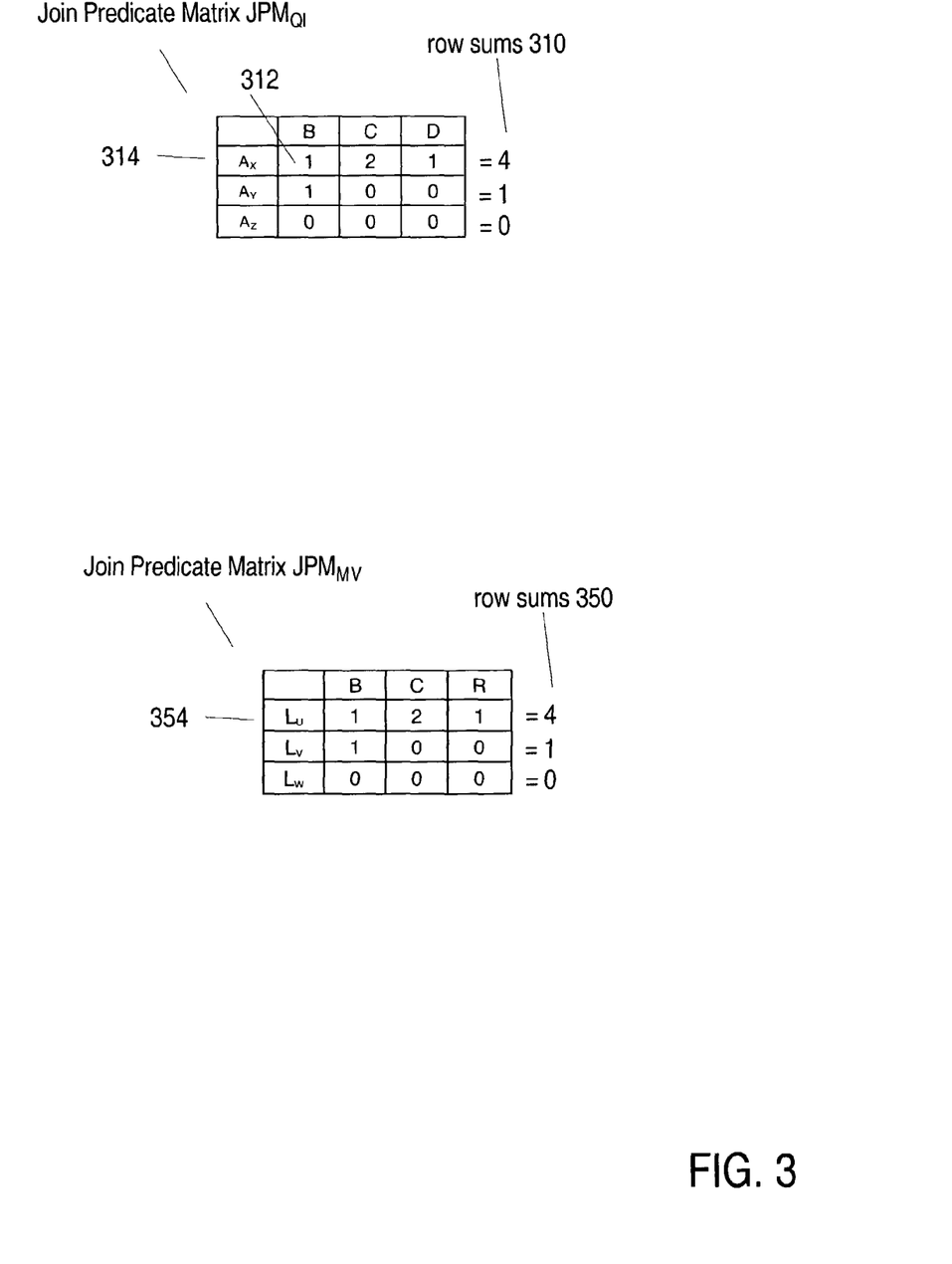
FIG. 3 is a diagram showing a join graph.

A join predicate matrix is a two dimensional array representing the join relationships between the instances of a table and various other tables in a query or materialized view definition. FIG. 3 is a diagram showing the join predicate matrix for instances of table A in query QI.

Referring to FIG. 3, it shows join predicate matrix $JPM_{QI}$. $JPM_{QI}$ is a matrix with cells that correspond to instances of a table and columns that correspond to other tables in QI. The cell at the intersection of a column and a row corresponds to the particular instance of table A for that row and the other table for that column. The cell contains the number of joins between its corresponding instance and table. For example, row 314 corresponds to instance $A_X$. The cell 312 in row 314 contains the value 1, the number of joins between $A_X$ and table B.

The single sweep mapping techniques described herein generate a join predicate matrix for every table that appears more than once in the query or materialized view definition. Note, that since there are two join predicates between $A_X$ and table C in query QI, the corresponding entry in $JPM_{QI}$ is 2. The rows of $JPM_{QI}$ are sorted in descending order according to the row sum p of each row, that is, the sum of the values in the row's cell. The row sum for the $i^{th}$ row is computed as follows, $$p = \sum_{j=1}^{N-1} JPM(i, j)$$

where N-1 is the number of columns in $JPM_{QI}$. Row sums 310 are the row sum values for the rows of $A_X$, $A_Z$, and $A_Y$, which are 4, 1, and 0, respectively.

FIG. 3 also depicts join predicate matrix $JPM_{MVT}$. Similar to $JPM_{QI}$, $JPM_{MVT}$ is a matrix with cells that correspond to instances of table $L_U$, $L_W$, and $L_V$, and columns that correspond to tables B, C, and R. Row 354 corresponds to instance $L_U$. The cells in row 314 contain 1, 2, and 1, the number of joins between $L_U$ and tables B, C, and R.

Single Sweep Mapping Techniques Overview

A single sweep mapping technique constructs, for each table with multiple instances in a query, a join predicate matrix, and a corresponding join predicate matrix for a materialized view if its definition also contains multiple instances for the table. For each instance of the table in the query, join predicates of the instance are compared to the join predicates involving instances of the table in the materialized view. The join predicates of the instances in the query are compared according to an order based on the row sums for the join predicate. For example, based on join predicate matrix $JPM_{QI}$, the join predicates of $A_X$ are compared first, and then the join predicates of $A_Y$. Thus, the instances with the greatest number of joins are compared first, and a match can be found much faster. The single sweep technique effectively superimposes the predicate matrix for the query and the materialized view and computes the best match.

As mentioned before, when a potential materialized view is considered for rewrite, it is tested to determine whether it satisfies rewrite criteria, including join compatibility. As a further optimization, as the join predicates are compared, their joins are organized into groups used to evaluate whether join compatibility is satisfied. The groups are as follows:

Common Section: The set of joins that are common to both the materialized view and the query are referred to as the common section.

Query delta: The set of joins that are in the query but not the materialized view.

Materialized view delta: The set of joins that are in the materialized view but not in the query.

The reason the materialized view delta is determined while comparing join predicates is that the materialized view may be used to evaluate whether the join compatibility test can be satisfied. To satisfy join compatibility, a materialized view delta must be lossless. This fact may be used to quickly rule out any ineligible materialized views, even before completely resolving the multiple instances in the query. Thus, when a join is added to the materialized delta, the materialized view delta is evaluated to determine if it lossless. If it is not lossless, the materialized view may be ruled out without further evaluating the materialized view.

One way to determine whether a materialized view is lossless is to determine whether every join in the materialized view is based on an equijoin between a primary key column and a foreign key column. If so, the materialized view delta is lossless.

As another optimization, joins of tables in the materialized view definition that are not in the query are added to the materialized view delta before commencing the process of resolving instances in the query. If the materialized view delta is not lossless, then the materialized view may be ruled out.

Single Sweep Mapping

Figure 4A:
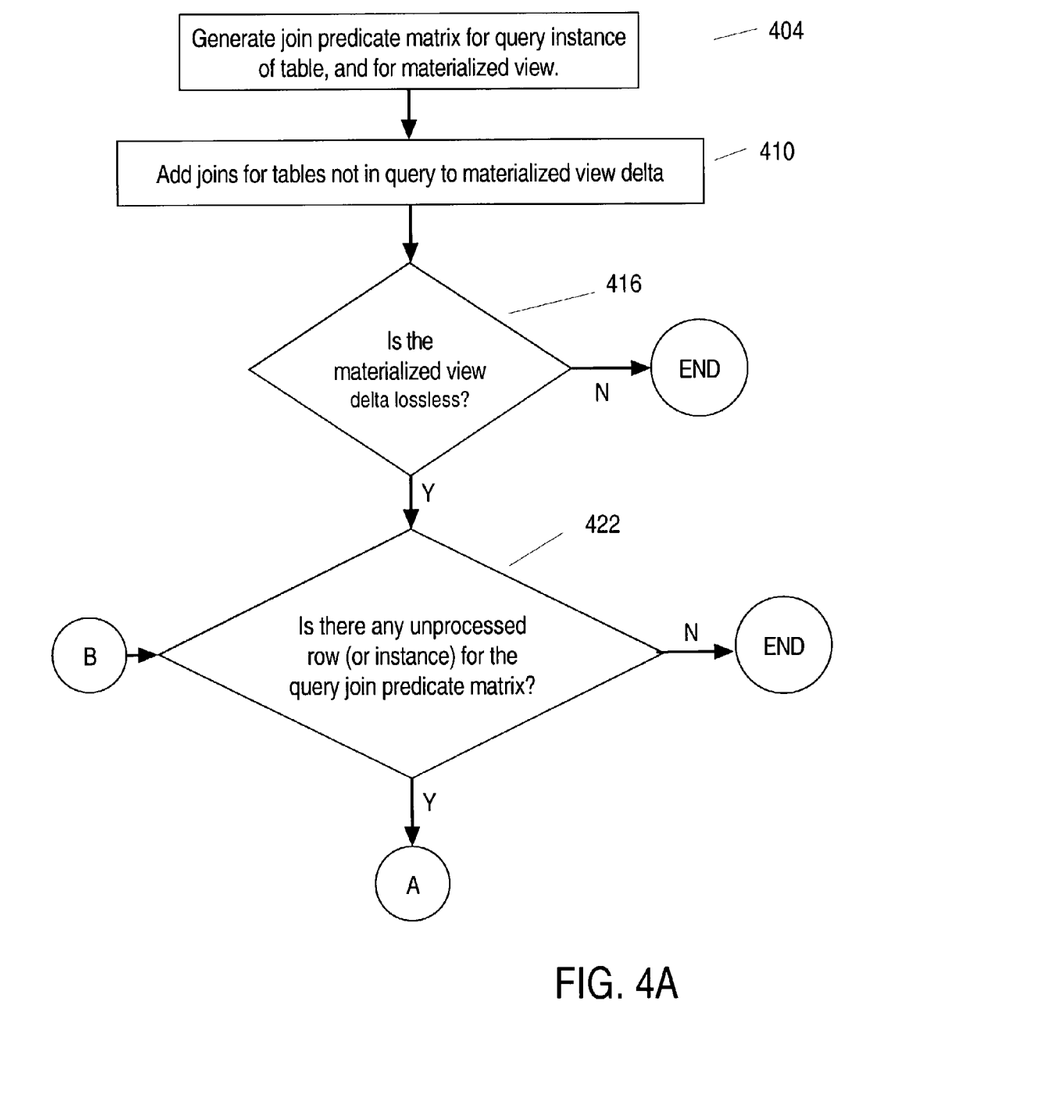
FIG. 4A is a flowchart showing steps of a process for mapping equivalent instances according to an embodiment of the present invention.
Figure 4B:
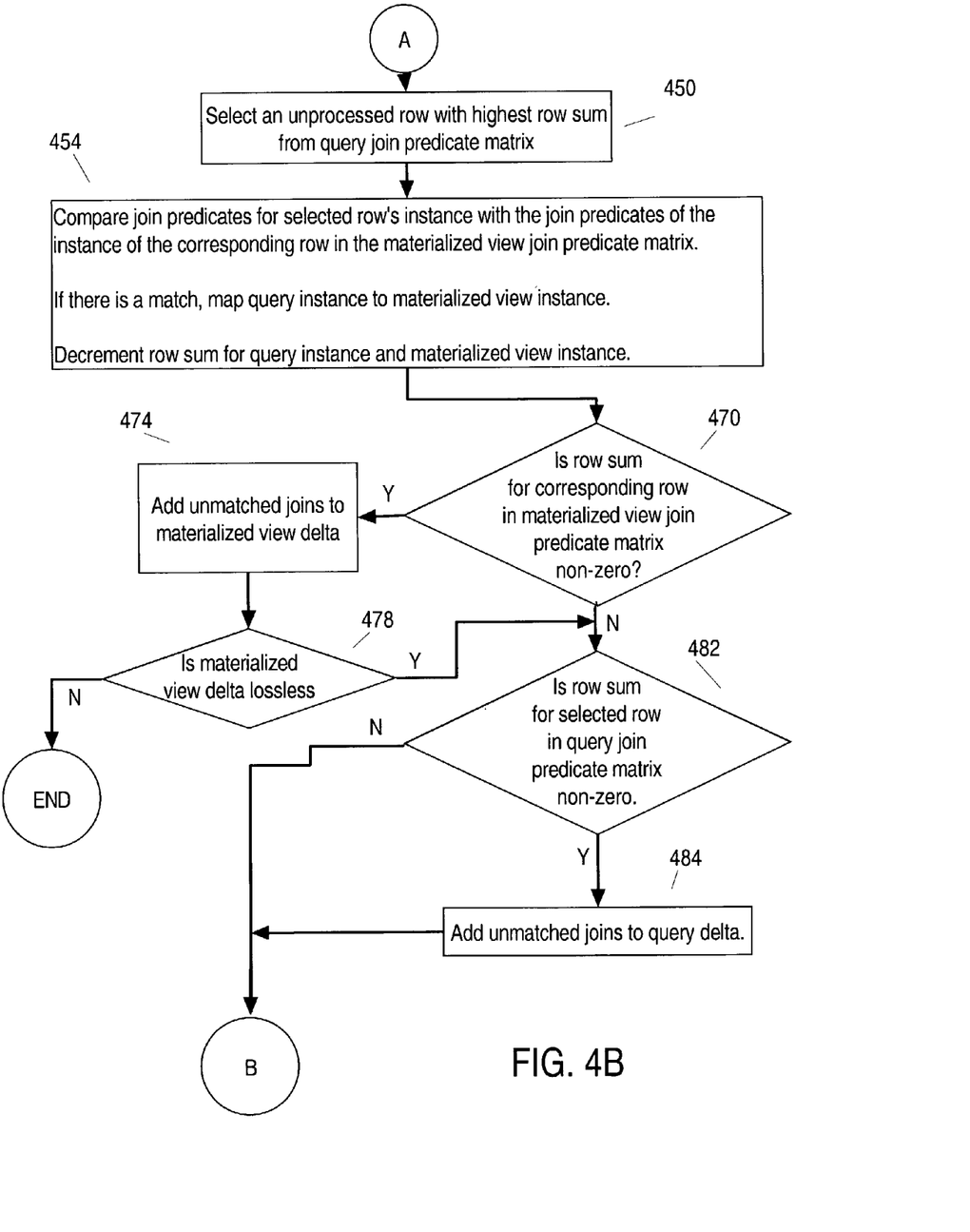
FIG. 4B is a flowchart showing steps of a process for mapping equivalent instances according to an embodiment of the present invention.

FIGS. 4A and 4B are flow charts depicting a process that may be executed by a database server to perform single sweep mapping for a query, where the query includes multiple instances of a table. The process is illustrated using table A, query QI, and materialized view MVI.

Referring to FIG. 4A, at step 404, join predicate matrixes are generated for the table in the query ("query join predicate matrix") and in the materialized view definition ("materialized view join predicate matrix"). In this example, join predicate matrix $JPM_{QI}$ is generated for QI and $JPM_{MVI}$ is generated for materialized view MVI.

At step 410, joins for tables not in query QI are added to the materialized view delta.

At step 416, it is determined whether the materialized view is delta is lossless. If the materialized view delta is lossless, then execution of the steps cease. The materialized view delta cannot satisfy the join compatibility test.

Step 422 is a step that is performed as part of a loop execution which repeats the steps shown in FIG. 4B. The loop is repeated based on the determination made at step 422. At step 422, it is determined whether there are any rows in the query join predicate matrix that have not been processed in a previous iteration of the loop. If so, execution proceeds to the steps shown in FIG. 4B, beginning with step 450. Otherwise, execution of the steps ceases.

Referring to FIG. 4B, at step 450, the database server selects an unprocessed row with the highest row sum from the query join predicate matrix. In the current example, no row from query join predicate matrix $JPM_{QI}$ has been processed in the loop. Therefore, the row selected is row 314, which has the highest row sum of 4.

The row selected at step 450 is herein referred to as the query JPM row. A query JPM row corresponds to a row ("mv JPM row") in the materialized view join predicate matrix that is in the same relative position that the query JPM row is within the query join predicate matrix. The instance represented by a query JPM row is referred to as the query JPM row instance; the instance represented by the mv JPM row is referred herein to as the mv JPM row instance. A join predicate involving the query JPM row instance is referred as a query JPM row join predicate; a join predicate involving a mv JPM row instance is referred to herein as a mv JPM row join predicate.

For example, row 314 in $JPM_{QI}$ is the JPM row that corresponds to mv JPM row 354 in $JPM_{MVI}$. Thus, the query JPM row instance is $A_X$, and the mv JPM row instance is $L_U$. The query JPM row predicates are the join predicates $A_X.a1=B.b1, A_X.a1=C.c1, A_X.a2=C.c3, A_X.a1=D.d1$. The mv JPM row predicates are $L_U.a1=B.b1$, $L_U.a1=C.c1$, $L_U.a2=C.c3$, and $L_V=B.b1$.

At step 454, the query row JPM predicates are compared to the mv JPM row predicates. If at least one query join predicate matches a mv JPM row predicate, then the current query instance for the current row is mapped to the current mv instance. A join predicate matches another join predicate if they define the same conditions based on the same column, even if the join predicates refer to the same table using different labels. The row sum of query JPM row and the mv JPM row is decremented for each query join predicate match.

In the current illustration, after comparing the query row JPM predicates and the mv JPM row predicates, $A_X.a1=B.b1$ is matched to $L_U.a1=B.b1$, $A_X.a1=C.c1$ is matched to $L_U.a1=C.c1$, and $A_X.a2=C.c3$ is matched to $L_U.a2=C.c3$. The row sum for query JPM row 314 is decremented to 1, and the row sum for mv JPM row 354 is decremented to 1. Query JPM row predicate $A_X.a1=D.d1$ was not matched to any mv JPM row predicate. Mv JPM row predicate $L_V=B.b1$ was also left unmatched.

The row sums for the query JPM row and the mv JPM row are nonzero. A nonzero value for the row sum of a query JPM row indicates that there are joins to add to the query delta, i.e. the joins based on unmatched query JPM row predicates. Likewise, a nonzero value for the row sum of the mv JPM row indicates that there are joins to add to the materialized view delta.

At step 470, the database server determines whether the row sum for the mv JPM row is nonzero. If this row sum is nonzero, then execution flows to step 474, where the joins of any unmatched predicates are added to the materialized view delta. At step 478, the database server determines whether the materialized view delta is lossless. If the materialized view delta is lossless, the materialized view may not be used to rewrite the query in issue, and execution of the steps cease.

In the current illustration, the row sum for mv JPM row 354 is one. Therefore, execution proceeds to step 474, where the join corresponding to mv JPM row predicate $L_V=B.b1$ is added to the materialized view delta. For purpose of illustration, at step 478, the materialized view delta is determined to be lossless, execution thus proceeds to step 482.

At step 482, the database server determines whether the row sum for the query JPM row is nonzero. If the row sum is nonzero, then at step 484, any unmatched query JPM row predicates are added to the query delta. Next, execution proceeds to step 422.

In the current example, it is determined that the row sum for the query JPM row is 1, a nonzero value. At step 484, the unmatched query JPM row predicate is added to the query delta.

Execution proceeds to step 422, where the remaining rows in $JPM_{QI}$ are processed.

Single Sweep Technique Executes in Linear Time

The single sweep mapping technique illustrated in FIGS. 4A and 4B may be executed in linear time, that is, the time it is takes to execute is linearly related to the number of instances of a table in a query. The following lemma sets forth conditions under which this technique may be implemented to run in linear time.

Lemma 2 Given a materialized view, MV, with M distinct tables, where one of them, table A, occurring m times and a query, Q, with N distinct tables, M>N, where the same table A occurring n times with m≧n, the worst case number of comparisons required to correctly map each of the m instances of MV to the instances of Q using Join Predicate Matrices for both the query and the materialized view is, O(N).

Proof: The single sweep technique depicted in FIGS. 4A and 4B has only one for loop and thus determines the instance numbers in O(N) (that is, order of N) time for all instances of table A in query Q. Because the technique sweeps through all the instances of the table in this way to compare join predicates involving the instances, the technique is referred to as single sweep.

Hardware Overview

Figure 5:
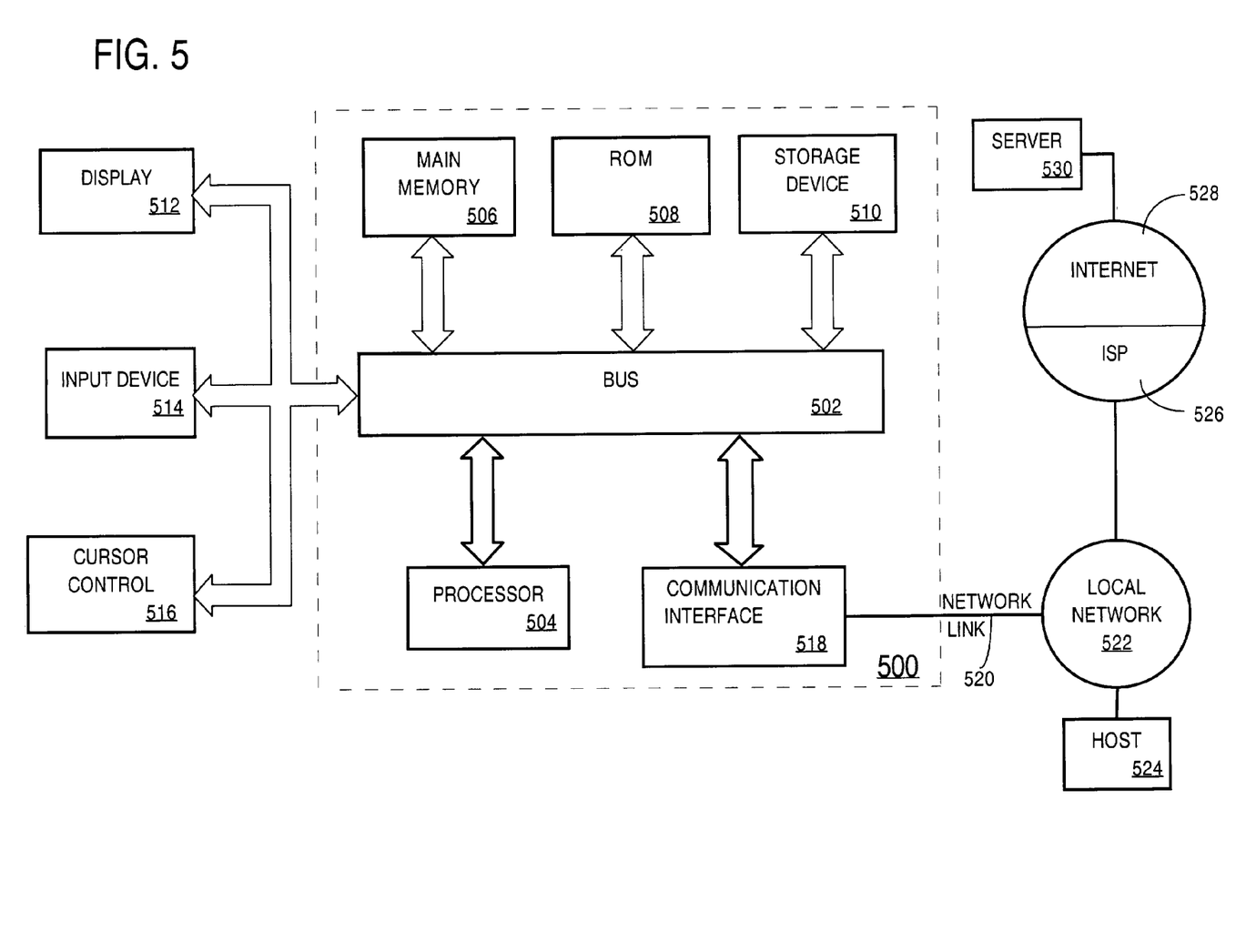
FIG. 5 is a diagram of computer that may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for use in evaluating queries, the method including the computer-implemented steps of:
   receiving a query that includes a first plurality of labels for a first table, wherein each label of said first plurality of labels is different than any other label of said first plurality of labels, wherein said query includes first one or more join predicates that each reference at least one of said first plurality of labels;
   wherein a materialized view definition includes a second plurality of labels for said first table, wherein said materialized view definition includes second one or more join predicates that each reference at least one of said second plurality of labels;
   causing a comparison of said first one or more join predicates to said second one or more join predicates to determine which of said first one or more join predicates are equivalent to a join predicate of said second one or more join predicates;
   generating data representing a mapping of a first label of said first plurality of labels to a second label of said second plurality of labels based on said comparison;
   wherein said first label is different than said second label; and
   wherein at least one of said first label and said second label is an alias for said first table.

2. The method of claim 1, wherein:
   said first one or more join predicates include a first subset of join predicates that reference the first label and a second subset of join predicates that reference a second label;
   (a) determining whether any of said first subset of join predicates is equivalent to a join predicate in said second one or more join predicates; and
   (b) determining whether any of said second subset of join predicates is equivalent to a join predicate in said second one or more join predicates.

3. The method of claim 2, wherein the steps further include:
   determining that said first subset of join predicates has a first number of join predicates;
   determining that said second subset of join predicates has a second number of join predicates; and
   performing the steps of (a) and (b) in an order based on said first number and said second number.

4. The method of claim 2, wherein step (a) is performed before step (b), wherein the steps further include:

before performing step (b):
   determining that at least one join predicate from said second one or more join predicates is not equivalent to a join predicate in said first subset of join predicates, wherein said at least one join predicate defines a join condition of a join;
   establishing said join as a member of a set of one or more joins with no corresponding join in said query.

5. The method of claim 4, wherein the steps further include determining, after performing the step of establishing said join as a member and before performing step (b), whether said materialized view definition can satisfy rewrite criteria based on said set of one or more joins with no corresponding join in said query.

6. The method of claim 1, wherein:
   said first one or more join predicates include a first subset of join predicates that reference the first label and a second subset of join predicates that reference a second label; and
   the steps further include:
      determining whether any of said first subset of join predicates is equivalent to a join predicate in a third subset of join predicates from said second one or more join predicates, wherein said third subset of join predicates reference a label of said second plurality of labels but no other label of said second plurality of labels; and
      determining whether any of said second subset of join predicates is equivalent to a join predicate in a fourth subset of join predicates from said second one or more join predicates, wherein said fourth subset of join predicates reference a another label of said second plurality labels but no other label of said second plurality of labels.

7. The method of claim 6, wherein the steps further include:
   generating a first matrix with rows corresponding to each label of said first plurality of labels and columns corresponding to another table for which at least one join is defined by said query between said first table and said other table;
   generating a second matrix with rows corresponding to each label of said second plurality of labels and another table for which at least one join is defined by said materialized view definition between said first table and said other table;
   wherein each cell in said first matrix and said second matrix corresponds to a particular label and a particular table and has a value representing a number of joins involving said particular label and said particular table; and
   for each row of the first matrix that has a corresponding row in the second matrix, determining which one or more join predicates that reference the particular label of said each row is the equivalent of a join predicate that references the particular label of the corresponding row in the second matrix.

8. The method of claim 7, wherein the method further includes the steps of:
   for each row of said first matrix and said second matrix, determining a sum based on the values of the cells of said each row; and
   wherein the order of the rows within said first matrix and said second matrix is based on the sums determined for the rows;
   wherein said each row in the first matrix that has a corresponding row in the second matrix has, as the corresponding row, the row in the second matrix in the same order position within the second matrix that said each row in the first matrix is in within the first matrix; and wherein the determining steps performed for each row of the first matrix that has a corresponding row in the second matrix are performed in the order of said first matrix.

9. The method of claim 1, wherein the steps further include:

after causing a comparison of some but not all of said first one or more join predicates to said second one or more join predicates to determine which of said first one or more join predicates are equivalent to which of said second one or more join predicates:

determining that at least one join predicate from said second one or more join predicates is not equivalent to a join predicate in said first subset of join predicates, wherein said at least one join predicate defines a join condition of a join; and establishing said join as a member of a set of one or more joins with no corresponding join in said query.

10. The method of claim 9, wherein the steps further include determining, after performing the step of establishing said join as a member and before causing a comparison of all of said first one or more join predicates, whether said materialized view definition can satisfy rewrite criteria based on said set of one or more joins with no corresponding join in said query.

11. A computer-readable medium carrying one or more sequences of instructions for use in evaluating queries, wherein execution of the one or more sequences of instructions by one or more processors causes the one or more processors to perform the steps of:

receiving a query that includes a first plurality of labels for a first table, wherein each label of said first plurality of labels is different than any other label of said first plurality of labels, wherein said query includes first one or more join predicates that each reference at least one of said first plurality of labels;

wherein a materialized view definition includes a second plurality of labels for said first table, wherein said materialized view definition includes second one or more join predicates that each reference at least one of said second plurality of labels;

causing a comparison of said first one or more join predicates to said second one or more join predicates to determine which of said first one or more join predicates are equivalent to a join predicate of said second one or more join predicates;

generating data representing a mapping of a first label of said first plurality of labels to a second label of said second plurality of labels based on said comparison;

wherein said first label is different than said second label; and wherein at least one of said first label and said second label is an alias for said first table.

12. The computer-readable medium of claim 11, wherein:

wherein said first one or more join predicates include a first subset of join predicates that reference the first label and a second subset of join predicates that reference a second label;

(a) determining whether any of said first subset of join predicates is equivalent to a join predicate in said second one or more join predicates; and (b) determining whether any of said second subset of join predicates is equivalent to a join predicate in said second one or more join predicates.

13. The computer-readable medium of claim 12, wherein the steps further include:

determining that said first subset of join predicates has a first number of join predicates;

determining that said second subset of join predicates has a second number of join predicates; and performing the steps of (a) and (b) in an order based on said first number and said second number.

14. The computer-readable medium of claim 12, wherein step (a) is performed before step (b), wherein the steps further include:

before performing step (b):

determining that at least one join predicate from said second one or more join predicates is not equivalent to a join predicate in said first subset of join predicates, wherein said at least one join predicate defines a join condition of a join; and establishing said join as a member of a set of one or more joins with no corresponding join in said query.

15. The computer-readable medium of claim 14, wherein the steps further include determining, after performing the step of establishing said join as a member and before performing step (b), whether said materialized view definition can satisfy rewrite criteria based on said set of one or more joins with no corresponding join in said query.

16. The computer-readable medium of claim 11, wherein:

said first one or more join predicates include a first subset of join predicates that reference the first label and a second subset of join predicates that reference a second label;

determining whether any of said first subset of join predicates is equivalent to a join predicate in a third subset of join predicates from said second one or more join predicates, wherein said third subset of join predicates reference a label of said second plurality of labels but no other label of said second plurality of labels; and determining whether any of said second subset of join predicates is equivalent to a join predicate in a fourth subset of join predicates from said second one or more join predicates, wherein said fourth subset of join predicates reference a another label of said second plurality labels but no other label of said second plurality of labels.

17. The computer-readable medium of claim 16, wherein the steps further include:

generating a first matrix with rows corresponding to each label of said first plurality of labels and columns corresponding to another table for which at least one join is defined by said query between said first table and said other table;

generating a second matrix with rows corresponding to each label of said second plurality of labels and another table for which at least one join is defined by said materialized view definition between said first table and said other table;

wherein each cell in said first matrix and said second matrix corresponds to a particular label and a particular table and has a value representing a number of joins involving said particular label and said particular table; and for each row of the first matrix that has a corresponding row in the second matrix, determining which one or more join predicates that reference the particular label of said each row is the equivalent of a join predicate that references the particular label of the corresponding row in the second matrix.

18. The computer-readable medium of claim 17, wherein the steps further include:

for each row of said first matrix and said second matrix, determining a sum based on the values of the cells of said each row; and wherein the order of the rows within said first matrix and said second matrix is based on the sums determined for the rows;

wherein said each row in the first matrix that has a corresponding row in the second matrix has, as the corresponding row, the row in the second matrix in the same order position within the second matrix that said each row in the first matrix is in within the first matrix; and wherein the determining steps performed for each row of the first matrix that has a corresponding row in the second matrix are performed in the order of said first matrix.

19. The computer-readable medium of claim 11, wherein the steps further include:

after causing a comparison of some but not all of said first one or more join predicates to said second one or more join predicates to determine which of said first one or more join predicates are equivalent to which of said second one or more join predicates:

determining that at least one join predicate from said second one or more join predicates is not equivalent to a join predicate in said first subset of join predicates, wherein said at least one join predicate defines a join condition of a join; and establishing said join as a member of a set of one or more joins with no corresponding join in said query.

20. The computer-readable medium of claim 19, wherein the steps further include determining, after performing the step of establishing said join as a member and before causing a comparison of all of said first one or more join predicates, whether said materialized view definition can satisfy rewrite criteria based on said set of one or more joins with no corresponding join in said query.

* * * * *

UNITED STATES PATENT AND TRADEMARK OFFICE
CERTIFICATE OF CORRECTION

| | |
|---|---|
| PATENT NO. | : 7,406,469 B1 |
| APPLICATION NO. | : 10/177440 |
| DATED | : July 29, 2008 |
| INVENTOR(S) | : Thiyagarajan |

It is certified that error appears in the above-identified patent and that said Letters Patent is hereby corrected as shown below:

On sheet 4 of 7, in Figure 3, above Ref. Numeral 354, line 1, delete "$JPM_{MV}$" and insert -- $JPM_{MVI}$ --, therefor.

On sheet 4 of 7, in Figure 4B, Box 478, line 2, after "lossless" insert -- ? --.

In column 5, line 29, after "clause" insert -- . --.

In column 6, line 14, delete "$A_zB.b1.$" and insert -- $A_z=B.b1.$ --, therefor.

In column 6, line 54, delete "LB" and insert -- UB --, therefor.

In column 7, lines 35-36, delete " $\binom{n}{2}$comparisons. " and insert

-- $\binom{n}{2} \cdot 1$comparisons. --, therefor.

In column 11, line 16, delete "O(N)." and insert -- 0(N). --, therefor.

In column 11, line 19, delete "O(N)" and insert -- 0(N) --, therefor.

Signed and Sealed this

Twenty-second Day of December, 2009

David J. Kappos
*Director of the United States Patent and Trademark Office*